United States Patent [19]

Nakagawa et al.

[11] Patent Number: 5,071,887
[45] Date of Patent: Dec. 10, 1991

[54] POLYURETHANE ELASTOMER

[75] Inventors: Shigeru Nakagawa, Yokohama; Kiyofumi Murayama, Miura, both of Japan

[73] Assignee: Nippon Polyurethane Industry Co., Ltd., Tokyo, Japan

[21] Appl. No.: 480,249

[22] Filed: Feb. 15, 1990

[30] Foreign Application Priority Data

Feb. 17, 1989 [JP] Japan ..................................... 1-36046

[51] Int. Cl.$^5$ ............................................. C08G 18/14
[52] U.S. Cl. .................................... 521/137; 521/160; 521/161; 528/44; 528/52; 528/53; 528/67; 524/584; 524/586; 428/34.1; 428/632
[58] Field of Search ..................... 521/160, 161, 137; 528/53, 64, 44, 67, 52; 524/584, 586; 428/34.1, 632

[56] References Cited

U.S. PATENT DOCUMENTS

| | | | |
|---|---|---|---|
| 4,097,426 | 6/1978 | Koike et al. | 521/137 |
| 4,357,430 | 11/1982 | Vancleve | 521/137 |
| 4,382,125 | 5/1983 | Narayan et al. | 521/160 |
| 4,389,454 | 6/1983 | Horacek et al. | 528/44 |
| 4,460,737 | 7/1984 | Evans et al. | 524/584 |
| 5,010,161 | 4/1991 | Aoki et al. | 528/52 |

Primary Examiner—John Kight, III
Assistant Examiner—Duc Truong
Attorney, Agent, or Firm—Davis Hoxie Faithfull & Hapgood

[57] ABSTRACT

A polyurethane elastomer produced by reaction of a polyisocyanate with an amine-type polyol and another type polyol, the polyisocyanate being an isocyanurate-modified hexamethyelene diisocyanate; and the equivalent ratio of active hydrogen to isocyanate group to be reacted being in a range of from 0.8 to 1.6; and the ratio of the amine-type polyol to the another type polyol being in a range of from 10/90 to 100/0 by weight.

23 Claims, No Drawings

POLYURETHANE ELASTOMER

BACKGROUND OF THE INVENTION

1. Field of the Invention

The present invention relates to a poyurethane elastomer. More particularly, the present invention relates to a polyurethane elastomer useful for a sealing material in electrical appliances, and a terminal bundling material for medical and industrial hollow-fibers.

2. Related Background Art

Heretofore, polyurethane type bundling materials used for sealing materials in electrical appliances and for hollow-fibers in medical liquid-separating apparatuses have been made from an aromatic polyisocyanate such as tolylene diisocyanate (TDI), diphenylmethane diisocyanate (MDI), etc. as the isocyanate compound, and a castor-oil-type polyol, a polyether-type polyol, polyester-type polyol or an amine-type polyol as the polyol component. In the case of use for bundling hollow-fibers in medical liquid separation apparatuses, however, the elastomer is required to contain far less substance which may be eluted from the sealing portion. For the improvement thereof, Japanese Patent Laid-open Application Sho. 60-58156 discloses the use of a prepolymer prepared by reaction of hexamethylene diisocyanate (HMDI) with a polyol as a fraction of the polyisocyanate component. However, the prepolymers, which have been prepared by reaction of HMDI with a polyol such as 1,4-butanediol, castor oil, etc., generally contain a large amount of unreacted HMDI. Thus, the use of such prepolymer as the starting material for the bundling material is undesirable from the stand point of safety and hygiene of the workers, as well as insufficient in the decrease of the eluted matter from the cured polyurethane. Accordingly, further decrease of the unreacted HMDI is required.

Moreover, HMDI has the disadvantage of significantly low reactivity, causing slow curing after potting, with low productivity, as compared with aromatic diisocyanate, e.g., TDI and MDI.

A method for promoting the reaction of such polyisocyanate and a polyol is disclosed by Japanese Patent Laid-open Application Sho. 58-93716, in which a metal type catalyst, etc. are employed for shortening the curing time. However, the employed heavy metal such as Sn, Pb, Zn, Cd, etc., if eluted out, exerts harmful effects to a living body or deteriorates electrical properties, so that the use of such metal-type catalyst is not desirable for medical materials nor electrical materials.

Starting materials for polyurethane elastomers are required to have a viscosity suitable for potting to cause neither deterioration nor denaturation of quality of the cured products, even after storage, to exhibit stable performances.

SUMMARY OF THE INVENTION

The present invention is intended to provide an improved polyurethane elastomer by employing a specified aliphatic polyisocyanate as a polyisocyanate component and a specific polyol under specific conditions.

The present invention provides a polyurethane elastomer produced by reaction of a polyisocyanate with an amine-type polyol and another type polyol, the polyisocyanate being an isocyanurate-modified hexamethyelene diisocyanate; and the equivalent ratio of active hydrogen to isocyanate group to be reacted being in a range of from 0.8 to 1.6; and the ratio of the amine-type polyol to the another type polyol being in a range of from 10/90 to 100/0 by weight.

DETAILED DESCRIPTION OF THE PREFERRED EMBODIMENT

The polyisocyanate useful in the present invention is an isocyanurate-modified HMDI or a compound prepared by the isocyanuration-polymerization (polycyclotrimerization) of a HMDI-polyol adduct, having one or more of isocyanurate rings and two or more of isocyanate groups in one molecule. This isocyanurate-modified HMDI contains preferably an HMDI monomer in an amount of not more than 5%. Such isocyanuration-polymerization of HMDI is described in Japanese Patent Laid-open Applications Sho. 57-47319, and Sho. 57-47321.

The amine-type polyol useful in the present invention includes oxyalkylated derivatives of amino compounds having two or more active hydrogen atoms. Specifically, examples of amino-type alcohols are propylene oxide (PO) adducts or ethylene oxide adducts of amino compounds such as ethylenediamines, e.g., N,N,N',N'-tetrakis(2-hydroxypropyl)ethylenediamine, and N,N,N',N'-tetrakis(2-hydroxyethyl)ethylenediamine; and mono-, di-, and tri-ethanolamines, etc. Specific preferable examples of amine-type polyols are propylene oxide adducts or ethylene oxide adducts of ethylenediamines such as N,N,N',N'-tetrakis(2-hydroxypropyl)ethylenediamine, etc.

The polyols other than amine-type polyols, which can be used in the present invention include low-molecular polyols, polyether polyols, castor-oil-type polyols, polyester-type polyols, etc.

The examples of the low-molecular polyols are bifunctional ones such as ethylene glycol, diethylene glycol, propylene glycol, 1,4- or 1,3-butanediol, 1,6-hexanediol, neopentylglycol, hydrogenated bisphenol-A, etc.; tri- or higher-functional ones (3- to 8-functional ones) such as glycerin, trimethylolpropane (TMP), hexanetriol, pentaerythritol, sorbitol, etc.

The examples of the polyether polyols are alkylene oxide adducts ($C_2$ to $C_4$ alkylene oxides, e.g., ethylene oxide (EO), propylene oxide, and butylene oxide) of the aforementioned low molecular-weight polyols, and ring-opening polymerization products of alkylene oxides; specifically, polyethylene glycol, polypropylene glycol, polytetramethylene glycol, etc. Capped polyethers, generally so called, may also be used. In these polyethers, EO, PO, etc. may be used singly or in combination of two or more thereof. When PO is used, the addition may be conducted in a process of block addition, random addition, or mixed block and random addition. Preferably, at the end of the molecule, EO is added to form a primary end group to raise the reactivity.

The examples of castor-oil-type polyols are polyester polyols derived from castor oil, or castor oil fatty acid, and a low molecular polyol (e.g., diglyceride and monoglyceride of castor oil fatty acid, and mono-, di-, and tri-esters of castor oil fatty acid with trimethylolpropane, mono-, di-, and tri-esters of castor oil fatty acid with polypropylene glycol, and mono-, di-, and tri-esters of castor oil fatty acid with polyethylene glycol, etc.).

The examples of the polyester polyols are linear or branched polyester polyols derived from a polycarboxylic acid (namely, an aliphatic saturated or unsaturated polycarboxylic acid such as adipic acid, azelaic acid, dodecanoic acid, maleic acid, fumaric acid, itaconic acid, dimerized linolic acid; and an aromatic polycarboxylic acid such as phthalic acid, and isophthalic acid) with a polyol (the above-mentioned low molecular polyol and/or polyether polyol); polylactone polyols such as polycaprolactone polyol prepared by addition-polymerization of a substituted or unsubstituted caprolactone (such as ε-caprolactone, α-methyl-ε-caprolactone, ε-methyl-ε-caprolactone, etc.) on an initiating base material [such as a glycol (e.g., ethylene glycol), a triol, etc.] in the presence of a catalyst (such as an organometallic compound, a metal chelate compound, a fatty acid metal acyl compound, etc); polyetherester polyols prepared by reaction of an alkylene oxide (such as EO, PO, etc.) with a polyester having terminal carboxylic groups and/or hydroxyl groups to cause addition reaction.

Furthermore, for example, the polyurethane type polyols derived by reaction of the above-mentioned polyol with a diisocyanate selected from aliphatic diisocyanates such as HMDI, alicyclic diisocyanates such as 1-isocyanato-3-isocyanatomethyl-3,5,5-trimethylcyclohexane (IPDI), and bis (4-isocyanatocyclohexyl)methane (hydrogenated MDI), and araliphatic diisocyanate such as xylylene diisocyanate at an NCO/OH equivalent ratio of not more than 1.

Of these polyols, preferable are polyethylene glycol and capped ether which are a polyether polyol having an equivalent of from 100 to 500 and having terminal primary alcohol groups. Castor-oil-type polyols are also preferable, especially the ones which have an equivalent of from 200 to 800.

The ratio of the amine-type polyol component and the other type polyol component in the present invention is such that the amount of the amine-type polyol from 10 to 100% by weight of the total polyol. The content of 10% by weight or less of the amine-type polyol is not desirable in view of the lengthened gel time, less workability, and less productivity. The amine-type polyols may be used in mixture with other polyols in appropriate amount in correspondence with the required properties for the bundling materials and the sealing materials.

The reaction of a polyisocyanate with a polyol in the present invention is conducted at the equivalent ratio of the active hydrogen to NCO group in the range of from 0.8 to 1.6, preferably from 0.9 to 1.2. Normally, the curing is conducted at the active hydrogen/NCO ratio of 1.0. Generally, however, curing may be conducted by blending at the active hydrogen/NCO equivalent ratio within the range of from 0.8 to 1.6 for the purpose of adjustment of curing time, and formation of variety of the cured resin properties. Outside the range of from 0.8 to 1.6, curing may not occur, or the desired resin properties may not achieved.

The curing is normally practiced at a room temperature. The gel time is normally in the range of from 5 to 90 minutes. If necessary, the gel time and the time for complete cure may be shortened, or required mixing viscosity may be achieved, by raising the temperature up to 30° to 80° C. The resin component (the main material and the curing agent) may be heated to accelerate the reaction of isocyanate with the active hydrogen. At a temperature of 30° C. or lower, the viscosity of the cured resin component is increased, which retards uniform mixing or lengthens the gel time, while at a temperature of 80° C. or higher, the resin itself may come to be deteriorated and curing may proceed extremely rapidly, which are not desirable from the point of view of operation.

The polyurethane elastomer thus produced is useful for a fiber-end bundling material and a sealing material for hollow-fibers employed in a fluid separation apparatus, and a sealing material. The bundling and sealing of the end portion of the hollow-fibers is usually conducted according to the centrifugal molding method, which is described, for example, in Japanese Patent Laid-open Applications Sho. 57-58963, and Sho. 57-58964.

The hollow-fibers include those prepared from materials having properties of a semipermeable membrane, such as regenerated cellulose, cellulose acetate, cellulose ether, polyethylene, polypropylene, polyamide, polysulfone, polyacrylamide, polyacrylonitlile, polyester, polycarbonate, polyvinyl chloride, polyurethane, casein, collagen, etc.

The constitution of a medical fluid separation apparatus employing the hollow-fibers sealed with a bundling material of the present invention, other than the bundling agent, may be similar to those disclosed, for example, in Japanese Patent Laid-open Applications Sho. 56-15757, Sho. 58-75556, Sho. 58-92423, Sho. 58-206757, and Sho. 59-225066. The examples of the specific applications include a blood plasma separation apparatus, an artificial lung, an artificial kidney, industrial, medical, and general water clarification apparatuses, and drug separation apparatuses.

The polyurethane elastomers derived from a reaction of polyisocyanate with a polyol according to the present invention contain an extremely small amount of matters which may be eluted when the elastomers are used for sealing materials or bundling materials, thus being advantageous for sealing materials and bundling materials for medical use. In particular, in use for a terminal bundling material for hollow-fibers of a medical fluid separation apparatus, there occurs no migration of a harmful metal compound such as of Sn, Zn, Pb, Cd, etc. into a living body because of the absence of such a harmful metal compound as a catalyst for cure promotion of the polyurethane bundling material. The polyurethane elastomer of the present invention, even though no heavy metal type catalyst is employed, has curing characteristics of the same level as that of aromatic type polyurethane, and the starting materials therefor are liquid at room temperature, having viscosity appropriate for molding operation, so that the productivity is not adversely affected. Since the starting prepolymer does not substantially contain free HMDI monomer which is highly toxic and irritant, the starting prepolymer according to the present invention is safe and hygienical to the workers in molding operation. The polyurethane elastomers of the present invention are almost transparent in the thickness range for such uses, having suitable processability, thus being excellent as the bundling material for hollow-fibers. Such hollow-fibers exhibit excellent characteristics in fields where higher safety and a less amount of eluted matter are required, for example, in a terminal bundling material for hollow-fibers of a medical fluid separation apparatus with which blood are brought in to contact including a blood plasma separation apparatus, an artificial lung, an artificial kidney, and so on, and are considerably useful industrially.

The present invention is explained in more detail by referring to examples. The terms "part" and "%" are based on weight respectively, if not specially remarked.

EXAMPLE 1

133 parts of an isocyanurate-modified HMDI (Trade name: "Coronate EH", NCO content: 21.3%, HMDI monomer content: not more than 0.3%, made by Nippon Polyurethane Industry Co., Ltd., hereinafter referred to as C—EH), and a mixture of 60 parts of a castor-oil-type polyol (hydroxyl number: 120) and 40 parts of N,N,N',N'-tetrakis(2-hydroxypropyl)ethylenediamine (THPED) were blended, and the blended matter was cured. The equivalent ratio of NCO/active hydrogen was 1.0. In the molding operation, neither odor nor irritation to eye caused by HMDI was not perceived at all. The blended matter rapidly became uniform, giving a transparent pale-yellow cured matter. The detail is shown in Table 1.

EXAMPLE 2

143 parts of C—EH and a mixture of 25 parts of a capped ether (EO addition rate: 20%, molecular weight: 2500, hydroxyl value: 45), 30 parts of a castor-oil-type polyol (hydroxyl value: 160), and 45 parts of N,N,N',N'-tetrakis(2-hydroxyethyl)ethylenediamine (THEED) were blended, and the blended matter was cured. The equivalent ratio of NCO/active hydrogen was 0.95. The blended matter rapidly became uniform. In the molding operation, neither odor nor irritation to eye caused by HMDI was not perceived at all. The detail is shown in Table 1.

EXAMPLE 3

180 parts of C—EH and a mixture of 19 parts of a capped ether (molecular weight: 2500, hydroxyl value: 45), 24 parts of a castor-oil-type polyol (hydroxyl number: 160) and 57 parts of THEED as polyol components were blended. The blended matter was cured at a liquid temperature of 50° C. The equivalent ratio of NCO/active hydrogen was 1.0. The blended matter rapidly became uniform, giving a transparent pale-yellow cured matter. In the molding operation, neither odor nor irritation caused by HMDI was not perceived at all. The detail is shown in Table 1.

COMPARATIVE EXAMPLE 1

A reaction of 204 parts of HMDI and 576 parts of polypropylene glycol (molecular weight: 2000) were carried out at 90° C. for 20 hours, to give a prepolymer having NCO terminals as a polyisocyanate component. The resulting prepolymer had a viscosity of 1200 cP at 25° C., an NCO content of 9.8%, and a free HMDI of 8.8%. THPED was blended with the prepolymer in an amount to give an NCO/active hydrogen equivalent ratio of 1.0, and the blended matter was cured. Although the blended matter became uniform rapidly, the initial mixing viscosity was so high that a gel time of 30 minutes was required, which was not desirable in the operation. Further, in the blending operation, strong odor and irritating to eyes was caused by the HMDI monomer contained in the prepolymer, which was not desirable in working hygiene. The detail was shown in Table 1.

COMPARATIVE EXAMPLE 2

315 parts of MDI and 275 parts of three-functional polypropylene polyol (molecular weight: 1500) were allowed to react at 80° C. for 4 hours, to give a prepolymer having NCO terminals as a polyisocyanate component. The resulting prepolymer had an NCO content of 14.2% and a viscosity of 5200 cP at 25° C. A mixture of 332 parts of castor-oil-type polyol (hydroxyl value: 160) and 78 parts of THPED were blended with the prepolymer in an amount to give an NCO/active hydrogen equivalent ratio of 1.0, and the blended matter was cured. The detail was shown in Table 1.

EXAMPLE 4

75 parts of C-EH and 25 parts of THEED were blended and the blended matter was cured. The both components, in an NCO/active hydrogen equivalent ratio of 1.0, dissolved with each other to become uniform. In the molding operation, neither odor nor irritation to eye caused by HMDI monomer was not perceived at all. The detail is shown in Table 1.

Test Method for Eluted Matter (Based on Approval Standard for Dialysis-type Artificial Kidney)

The support and the flow-path-connecting tubes to be used in a dialysis-type artificial kindney are taken respectively in an amount of approximately 15 g (each having front-side and back-side surface area of approximately 200 $cm^2$), which are cut into pieces having surface areas of 2 $cm^2$ (or length of approximately 2 cm). The cut pieces are put into a container containing 150 ml of water which had been boiled and cooled. It is heated to 70°±5° C. for 1 hour. Having been cooled, the liquid is taken out from the container, and water is added to fill it up to a volume of 150 ml, which is used for a test solution. Separately, water which has been boiled and cooled is used for the blank test solution. The test solution and the blank solution are subjected to the tests below.

Ultraviolet Absorption Spectrum

The absorbance of the test solution is measured at the solution layer thickness of 10 mm and the wavelength range of from 220 nm to 350 nm by employing the blank solution as the reference. The absorbance should be not more than 0.1.

Potassium Permanganate-Reducing Material 10.0 ml of the test solution is put into an Erlenmeyer flask. Thereto 20.0 ml of 0.01N potassium permanganate solution and 1.0 ml of dilute sulfuric acid are added. The mixture is boiled for 3 minutes. After cooling, 0.10 g of potassium iodide is added to the mixture, and the flask is tightly closed. The mixture solution is mixed by shaking, and is left stand for 10 minutes. Thereafter the solution is titrated with a 0.01N sodium thiosulfate solution (with an indicator of 5 drops of starch reagent solution). Separately, 10.0 ml of the blank test solution is subjected to the same treatment. The difference in the consumption of the 0.01N potssium permanganate solution between the test solution and the blank test solution should be not more than 1.0 ml.

TABLE 1

| | Example | | | | Comparative example | |
|---|---|---|---|---|---|---|
| | 1 | 2 | 3 | 4 | 1 | 2 |
| Curing temperature (°C.) | 25 | 50 | 50 | 25 | 25 | 40 |
| Mixing viscosity (cP/25° C.) | 1600 | 720 | 1300 | 2600 | 1800 | 4800 |
| Gel time (minutes) | 13 | 10 | 9 | 12 | 28 hrs. | 7 |
| Hardness (JIS-A) | 98 | 98 | 85 | 100 | 30 | 99 |
| Eluted UV maximum absorbance | 0.020 | 0.025 | 0.023 | 0.025 | 0.021 | 0.083 |
| matter Difference in consumption | 0.12 | 0.13 | 0.10 | 0.18 | 0.73 | 0.38 |
| test of potassium permanganate | | | | | | |

We claim:

1. A polyurethane elastomer produced by reaction of a polyisocyanate with an amine-type polyol and a non-amine type polyol, the polyisocyanate being an isocyanurate-modified hexamethylene diisocyanate; the equivalent ratio of active hydrogen to isocyanate group to be reacted being in a range of from 0.8 to 1.6; and the ratio of the amine-type polyol to the non-amine type polyol being in a range of from 10/90 to 100/0 by weight.

2. The polyurethane elastomer of claim 1 wherein the isocyanurate-modified hexamethylene diisocyanate is produced by isocyanuration-polymerization of a HMDI-polyol adduct.

3. A polyurethane elastomer produced by reaction of a polyisocyanate with an amine-type polyol and a non-amine type polyol, the polyisocyanate being an isocyanurate-modified hexamethylene diisocyanate containing not more than about 5 percent by weight of unreacted HMDI monomer; the equivalent ratio of active hydrogen to isocyanate group to be reacted being in a range of from 0.8 to 1.6; and the ratio of the amine-type polyol to the non-amine type polyol being in a range of from 10/90 to 100/0 by weight.

4. The polyurethane elastomer of claim 1 wherein the amine-type polyol is a propylene oxide adduct of an ethylenediamine.

5. The polyurethane elastomer of claim 1 wherein the amine-type polyol is an ethylene oxide adduct of an ethylenediamine.

6. The polyurethane elastomer of claim 1 wherein the amine-type polyol is selected from the group consisting of N,N,N',N'-tetrakis(2-hydroxypropyl)ethylenediamine and N,N,N',N'-tetrakis(2-hydroxyethyl)ethylenediamine.

7. The polyurethane elastomer of claim 1 wherein the non-amine type polyol is a polyether polyol.

8. The polyurethane elastomer of claim 7 wherein the polyether polyol is an alkylene oxide adduct.

9. The polyurethane elastomer of claim 8 wherein the polyether polyol has terminal primary alcohol groups.

10. The polyurethane elastomer of claim 1 wherein the non-amine type polyol is a castor-oil-type polyol.

11. The polyurethane elastomer of claim 1 wherein the non-amine type polyol is a polyester polyol.

12. The polyurethane elastomer of claim 1 wherein the equivalent ratio of active hydrogen to isocyanate group to be reacted is in a range of from 0.9 to 1.2.

13. The polyurethane elastomer of claim 3 wherein the amine-type polyol is N,N,N',N'-tetrakis(2-hydroxypropyl)ethylenediamine and the non-amine type polyol is a castor-oil-type polyol.

14. The polyurethane elastomer of claim 3 wherein the amine-type polyol is N,N,N',N'-tetrakis(2-hydroxyethyl)ethylenediamine, and the non-amine type polyol is a mixture of a polyether polyol with terminal primary alcohol groups and a castor-oil-type polyol.

15. A method of producing a polyurethane elastomer which comprises reacting a polyisocyanate with an amine-type polyol and a non-amine type polyol, the polyisocyanate being an isocyanurate-modified hexamethylene diisocyanate; the equivalent ratio of active hydrogen to isocyanate group to be reacted being in a range of from 0.8 to 1.6; and the ratio of the amine-type polyol to the non-amine type polyol being in a range of from 10/90 to 100/0 by weight.

16. The method of claim 15 wherein the isocyanurate-modified hexamethylene diisocyanate contains not more than about 5 percent by weight of unreacted HMDI monomer.

17. The method of claim 16 wherein the amine-type polyol is selected from the group consisting of an ethylene oxide adduct of an ethylenediamine and a propylene oxide adduct of an ethylenediamine.

18. The method of claim 16 wherein the non-amine type polyol is a castor-oil-type polyol.

19. The method of claim 16 wherein the non-amine type polyol is a mixture of a polyether polyol with terminal primary alcohol groups and a castor-oil-type polyol.

20. The method of claim 15 further comprising curing the polyurethane elastomer in a temperature range of from thirty degrees celsius to eighty degrees celsius.

21. The method of claim 15 wherein the equivalent ratio of active hydrogen to isocyanate group to be reacted is in a range of from 0.9 to 1.2.

22. A hollow fiber having a sealing material comprised of the polyurethane elastomer of claim 2.

23. The hollow fiber of claim 22 of a medical fluid separation apparatus.

* * * * *

UNITED STATES PATENT AND TRADEMARK OFFICE
CERTIFICATE OF CORRECTION

PATENT NO. : 5,071,887

DATED : December 10, 1991

INVENTOR(S) : Nakagawa, et al

It is certified that error appears in the above-identified patent and that said Letters Patent is hereby corrected as shown below:

On the title page, Item [75]: after "Miura", delete, "both of Japan" and insert --; Yukio Ohbuchi, Yokohama; Tomoyuki Yamagata, Zama, all of Japan--.

Signed and Sealed this

Sixth Day of April, 1993

*Attest:*

STEPHEN G. KUNIN

*Attesting Officer*   *Acting Commissioner of Patents and Trademarks*